Jan. 11, 1927.
J. N. GRIFFITH
1,613,654
FASTENING DEVICE FOR AUTOMOBILE PLATES
Filed Feb. 19, 1925
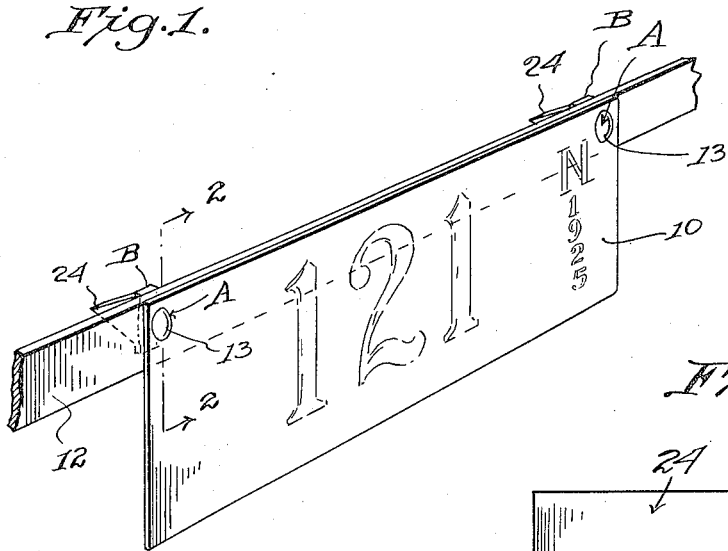
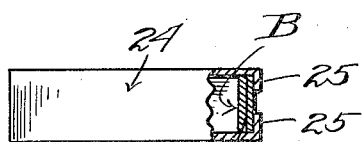
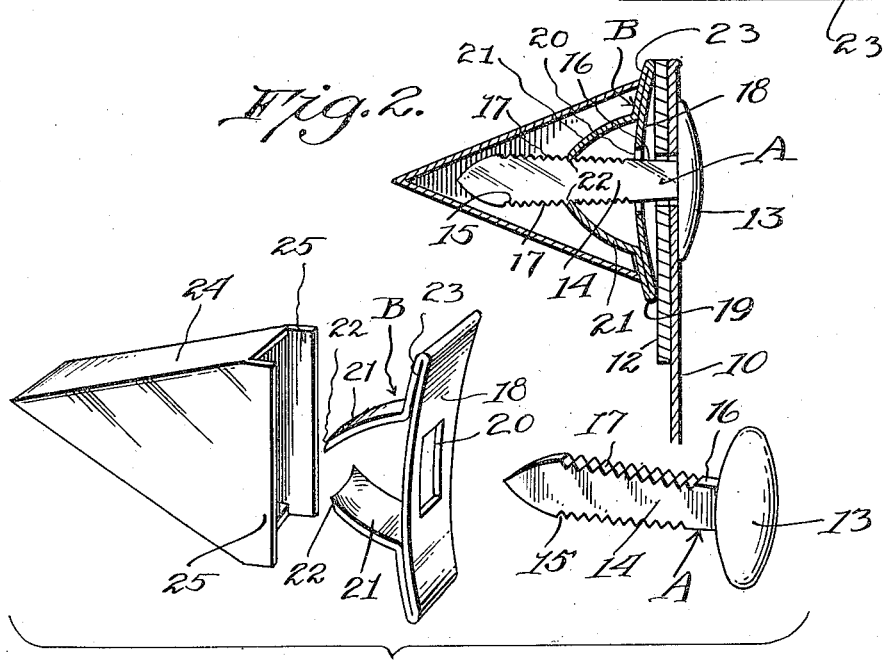
INVENTOR
John N. Griffith
BY
Shreve, Crowe & Gordon
ATTORNEYS Patented Jan. 11, 1927.

1,613,654

UNITED STATES PATENT OFFICE.

JOHN N. GRIFFITH, OF SCOTTDALE, GEORGIA.

FASTENING DEVICE FOR AUTOMOBILE PLATES.

Application filed February 19, 1925. Serial No. 10,294.

Generically, this invention relates to fastening devices, but it more especially comprehends the type adaptable for securing an automobile license plate or tag to its supporting bracket.

A principal object of this invention is the provision of a fastening device susceptible of being quickly and expeditiously positioned to firmly secure an automobile license plate to its supporting bracket, and without the employment of nuts, thumb-screws or other bunglesome locking elements.

Another object of this invention is the provision of a fastening device comprising a bolt and a locking element and designed to be operatively positioned by merely inserting the bolt through the tag, supporting bracket and locking element.

A further object of this invention is the provision of a fastening device, comprising a bolt, and a locking element confined within a casing, said casing designed to protect the locking element and the stem or shank of said bolt against deterioration from exposure to the weather.

Other objects are: to provide a fastening device of this character embodying a compressible locking element designed to firmly secure the plate against rattling disengagement due to rough vehicular travel, simple in construction, durable, manufacturable at a negligible cost, yet efficient for the purposes intended.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a perspective view of the device operatively positioned for holding a license plate in place;

Fig. 2 is a sectional view of the device taken on the line 2—2 of Fig. 1, and

Fig. 3 is a detailed view of the device showing parts in disassembled relation.

I am aware that many attempts have been made to perfect fastening devices for automobile license plates, but those with which I am familiar have proved deficient in being too difficult to position, incapable of retaining the plate for any considerable period from jostling loose and rattling, quickly deteriorating under weather conditions, etc., and it was to overcome such deficiencies and to provide a device simple in construction, easily and quickly positioned, efficient for maintaining the plate or tag against rattling, protected from dirt and the weather, and cheaply manufacturable, that I designed the device forming the subject matter of this invention.

In the illustrated embodiment characterizing this invention, there is shown an automobile license plate or tag 10, and a supporting bracket 12 of conventional design. The bolt or holding member A is formed with a head 13 and a stem or shank 14 adapted to extend through the license plate 10 and supporting bracket 12, and is formed wider or larger at its outer end as at 15 and gradually tapering towards its inner at 16, and is also formed along its opposite edges with serrations or notches 17 adapted to engage the retaining or lock member B for a purpose and in a manner hereinafter more fully described.

The lock member B is formed from spring metal with a base plate or member 18 slightly curved outwardly as at 19 and centrally apertured as at 20 to receive the shank 14. Spaced from the ends of said member 18 and integrally formed therewith are the complemental outstanding spring fingers 21 with their free ends beveled as at 22 and directed inwardly towards each other and nearly contacting, so as to engage the serrations 17 on either side of the shank 14 when the latter has been inserted through the aperture and between said fingers.

It is apparent that if desired, the said lock member B may be constructed from one piece of metal folded upon itself as at 23 to form the member 18 and with the free ends extending outwardly to form the fingers 21.

In order to effect a neat appearance and to protect the vital parts of the device against dirt and the corrosive effects of the elements, the lock member B is concealed by and contained within a casing 24, which in the present instance is of a substantially triangular or V-shaped configuration and formed with integral flanges 25 adapted to be folded over the longitudinal edges of the member 18 which firmly locks and conceals the said member 18 within the said casing 24. It is obvious, that instead of the flanges 25 strips or tongues may be substituted therefor adapted to be similarly folded over the ends of said member 18, or if desired both the side flanges 25 and the tongues may be employed, and in which case, the member 18 would be entirely housed and concealed within the said casing 24.

From the foregoing it will be noted, that the inversely tapered shank 14 tends not only to effect retension of the locking member B but prevents loss of said member even though the fingers 21 should become dislodged from any set position. It is further apparent that I have designed a unique spring lock member B so constructed that the spring tension of said fingers 21 will firmly hold their free ends in engagement with the serrations or notches 17 which effect is augmented by the action of the curved base plate 18 when its ends are brought into contact with the supporting bracket 12 by pressure of the head 13 and member 18 towards each other compressing the said plate and bracket therebetween.

The operation of the device would seem to be sufficiently clear from the above description as to render further explanation unnecessary.

In practice, I have found the form of my invention illustrated in the accompanying drawing and referred to in the above description as the preferred embodiment, to be the most efficient and practical; yet realizing the conditions concurrent with the adoption of my device will necessarily vary, I desire to emphasize that various minor changes in details of construction, proportion, and arrangement of parts, may be resorted to within the scope of the appended claim without departing from or sacrificing any of the principles of this invention.

Having thus described my invention, and without enumerating variations and equivalents, what I desire protected by Letters Patent is as set forth in the following claim:

In combination with a supporting bracket and license plate; of a fastening device including a bolt having an inversely wedge-shaped shank formed on opposite sides with serrations and adapted to extend through the bracket and plate, a lock member formed with an arcuate base adapted to receive said bolt and having outwardly projecting fingers adapted to engage said shank, a casing formed with attaching means to engage the longitudinal edges of said base for securing the lock member within the casing, the opposite ends of said base member being adapted to contact with the bracket to maintain the fingers in engagement with said serrations to prevent disengagement of the license plate and bracket and to hold the parts in rigid association.

J. N. GRIFFITH.